(12) United States Patent
Wartmann et al.

(10) Patent No.: US 7,136,229 B2
(45) Date of Patent: Nov. 14, 2006

(54) STEREOSCOPIC MICROSCOPE OBJECTIVE

(75) Inventors: Rolf Wartmann, Waake (DE); Jan Thirase, Goettingen (DE)

(73) Assignee: Carl Zeiss Jena GmbH, Jena (DE)

( * ) Notice: Subject to any disclaimer, the term of this patent is extended or adjusted under 35 U.S.C. 154(b) by 92 days.

(21) Appl. No.: 10/949,753

(22) Filed: Sep. 24, 2004

(65) Prior Publication Data
US 2005/0117214 A1 Jun. 2, 2005

(30) Foreign Application Priority Data
Sep. 27, 2003 (DE) .............................. 103 44 943

(51) Int. Cl.
*G02B 21/02* (2006.01)
*G02B 21/22* (2006.01)
(52) U.S. Cl. ....................... 359/659; 359/377
(58) Field of Classification Search ............... 359/659, 359/770, 377
See application file for complete search history.

(56) References Cited
U.S. PATENT DOCUMENTS
4,640,586 A 2/1987 Iba et al.
5,701,196 A * 12/1997 Nakamura ................... 359/362
6,339,507 B1 1/2002 Yonezawa

* cited by examiner

*Primary Examiner*—William C. Choi
(74) *Attorney, Agent, or Firm*—Reed Smith LLP

(57) ABSTRACT

The invention is directed to a stereoscopic microscope objective. A microscope objective of this kind contains five lenses. The first lens, considered from the object side, has a focal length between −2.11f and −1.20f; f is the total focal length of the microscope objective. This is followed by a second lens with a focal length between 1.30f and 1.45f, a third lens with a focal length between 1.15f and 1.37f, a fourth lens with a focal length between 0.65f and 1.7f, and a fifth lens with a focal length between −0.96f and 0.48f. Combined, the amount of the refractive power of the last two lenses is less than 0.31f. In the first lens and fifth lens, at least 80% of the refractive power is concentrated on the image-side surfaces. In the second lens, at least 60% of the refractive power is concentrated on the image-side surface. In the third lens, at least 60% of the refractive power is concentrated on the object-side surface. In the fourth lens, at least 70% of the refractive power is concentrated on the image-side surface. The first lens and the fifth lens are made of a material having an anomalous partial dispersion of a first type. The second lens, third lens and fourth lens are made of a material having an anomalous partial dispersion of a second type.

6 Claims, 1 Drawing Sheet

STEREOSCOPIC MICROSCOPE OBJECTIVE

CROSS-REFERENCE TO RELATED APPLICATION

This application claims priority of German Application No. 103 44 943.4, filed Sep. 27, 2003, the complete disclosure of which is hereby incorporated by reference.

BACKGROUND OF THE INVENTION a) Field of the Invention

In stereo microscopy, in contrast to standard microscopy, two separate light channels are guided through the same objective in order to achieve a stereoscopic effect. For this reason, the dimensions of objectives of this kind are greater than those of conventional objectives with respect to the diameter of the lenses. Therefore, correction of the longitudinal chromatic aberration is particularly important because this is perceived in the stereo microscope as a transverse chromatic aberration which severely interferes with the visual impression. Other desirable characteristics of such objectives are an image field which is as flat as possible in order to prevent the so-called globe effect which allows flat surfaces appear curved, a large working distance allowing convenient handling with the sample, and a high resolution.

b) Description of the Related Art

Various objectives which more or less satisfy these conditions are known from the prior art. U.S. Pat. No. 4,640,586 describes an objective type which, in its most compact form, makes do with four lenses. The objectives are well corrected chromatically and have, in part, a large working distance of more than 100 mm. However, a clear globe effect is disadvantageously noticeable and the relative aperture or focal ratio is also relatively small. U.S. Pat. No. 6,339,507 describes an objective which has only an insufficient chromatic correction.

On the other hand, objectives are also known in the prior art which combine a high resolution and a flattened image field. However, these objectives have the disadvantage that they have only a short working distance and are very bulky. For example, JP 2001-221955 proposes a solution with excellent chromatic correction, low distortion and a large focal ratio and in which the globe effect is only slightly apparent. However, the working distance is only 32 mm maximum and the objective is constructed in a very complicated manner with eight lenses and is costly.

OBJECT AND SUMMARY OF THE INVENTION

Therefore, it is the primary object of the invention to develop a compact, high-resolution objective for stereo microscopy which has a flattened image field as well as a large working distance.

This object is met by a stereoscopic microscope objective having a total of five lenses. The focal length of the first lens—considered from the object plane—is negative and the ratio to the total focal length f of the microscope objective is at least −2.11 and at most −1.20. The proportion of refractive power of the image-side surface of the first lens is at least 80%. The focal length of the second lens is positive, the ratio of the focal length of the second lens to the total focal length f of the objective is at least 1.30 and at most 1.45. The proportion of refractive power of the image-side surface of the second lens is at least 60%. The proportion of refractive power of the surface of the third lens facing the object is at least 60%. The third lens likewise has a positive focal length, the ratio of the focal length to the total focal length f is at least 1.15 and at most 1.37. The fourth lens which follows the latter likewise has a positive focal length and the ratio to the total focal length is at least 0.6 and at most 1.70. The proportion of refractive power of the object-side surface of the fourth lens is at least 70%. The fifth, and last, lens has a negative focal length and its ratio to the total focal length is at least −0.96 and at most −0.48. The proportion of refractive power of the image-side surface of the fifth lens is at least 80%. Further, the amount of refractive power of the fourth lens and fifth lens combined is less than 0.31-times the total refractive power of the microscope objective. Further, it should be noted that the first lens and fifth lens are made from materials having a partial dispersion of a first type. The two lenses can be made from the same material or from different materials; it is important only that they both have the partial dispersion of the first type. The same applies to the second lens, third lens and fourth lens which are made from materials having a partial dispersion of a second type.

The working distance of the objective according to the invention from the object is always on the order of magnitude of the focal length of the objective. The objective according to the invention is very compact: the overall length can be limited to less than 68% of the total focal length, and the diameter to less than 77% of the total focal length. In addition, the image field is flat. The Petzval sum which characterizes the curvature of the image field is less than 0.006. In the visible spectrum, the longitudinal chromatic aberration is less than 0.00035% of the focal length of the objective. A high resolution of the objective is achieved by the numerical aperture of 0.3 in cooperation with a diffraction-limited correction, i.e., the residual deviations of the image errors are less than the diameter of the diffraction disk.

In a development of the invention, the first lens and fifth lens are made of glasses with a short-flint anomaly. In another construction of the invention, the second lens, third lens and fourth lens are made of glasses with a fluor crown anomaly.

Advantageous constructions of the microscope objective result with constructional data set forth in claims 4 to 6, incorporated herein by reference. The refraction indexes relate to a wavelength of 546.07 nm. The Abbe numbers $v_e$ were calculated from the equation:

$$v_e = \frac{n_e - 1}{n_{F'} - n_{C'}},$$

where $n_e$ is the index of refraction at a wavelength of 546.07 nm, $n_{C'}$ is the index of refraction at a wavelength of 643.85 nm and $n_{F'}$ is the index of refraction at a wavelength of 479.99 nm. All three objectives have a numerical aperture of 0.3, but the focal length and working distance are different. For the first set of constructional data in dependent claim 4, the focal length is 78.2 mm and the working distance is 80.0 mm. For the second set of constructional data in dependent claim 5, the focal length is 78.5 mm and the working distance is 77.3 mm. Finally, for the third set of constructional data in dependent claim 6, the focal length is 78.2 mm and the working distance is 81.8 mm.

In the following, the microscope objective will be explained with reference to an embodiment example.

BRIEF DESCRIPTION OF THE DRAWING

In the accompanying drawing.

DESCRIPTION OF THE PREFERRED EMBODIMENT

Figure 1:
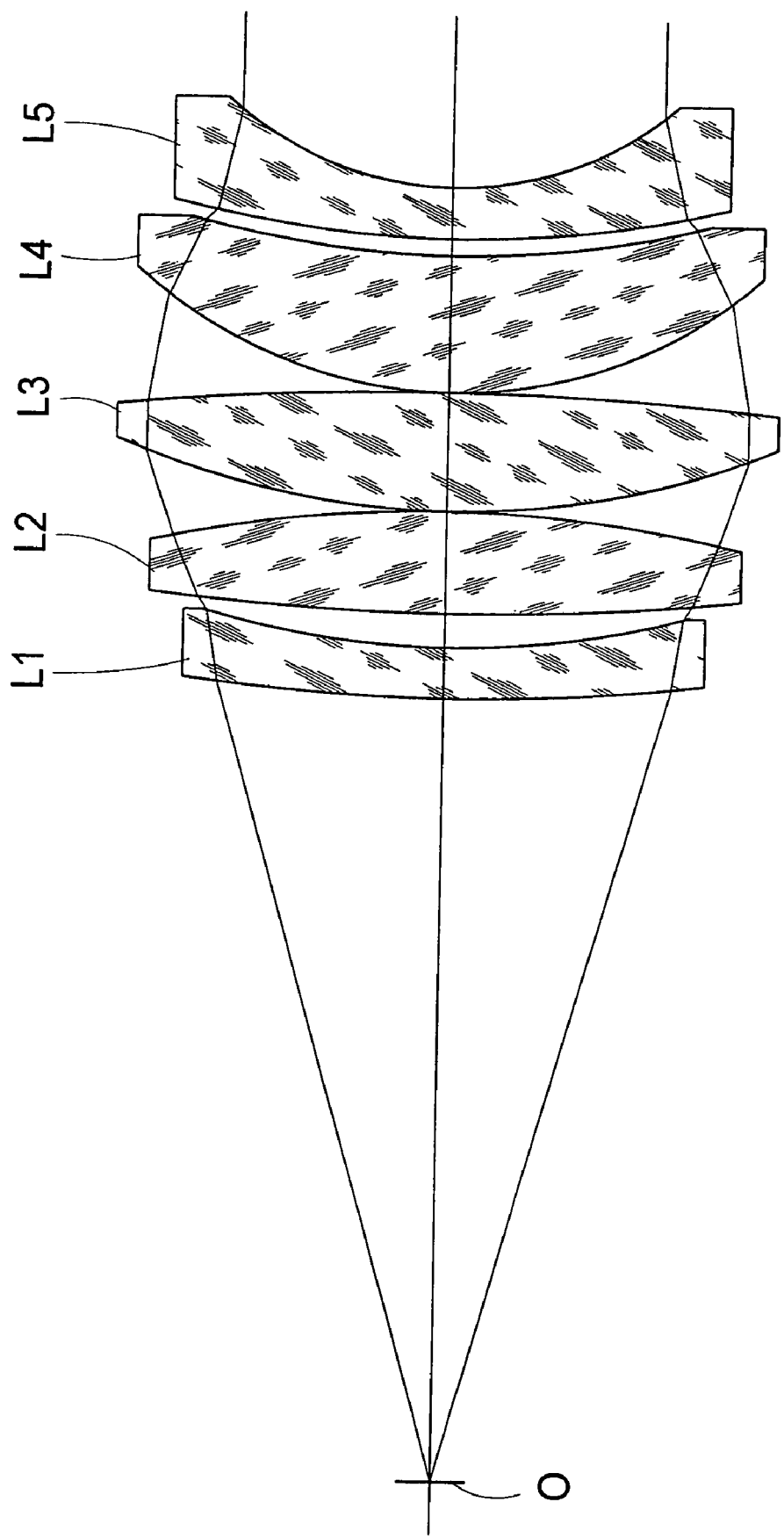
FIG. 1 shows a possible construction of an objective based on the constructional data indicated in dependent claim 6.

FIG. 1 shows a sectional view of the objective according to the invention. Located at the far left-hand side is the object plane O; a first lens L1 with negative focal length is at a distance of 81.8 mm. The thickness of this lens at the optical axis is 4 mm. The center points of the radius of curvature of the two lens surfaces of the first lens L1 lie on the image side. The curvature of the image-side surface of the first lens L1 is substantially greater than that of the object-side surface. The main portion of refractive power is therefore concentrated on the second surface. A second lens L2 is arranged at a distance of 2.49 mm along the optical axis. The second lens L2 has a positive focal length. The image-side surface also has a greater curvature than the object-side surface of the second lens L2 in this case. A third lens L3 which likewise has a positive focal length follows at a very slight distance of 0.15 mm along the optical axis. In this case, the curvature of the object-side surface is greater so that at least 60% of the refractive power is concentrated on it. A fourth lens L4 with positive focal length follows also at a very slight distance of 0.15 mm along the optical axis. In this case, the object-side lens surface likewise has a substantially greater radius of curvature than the image-side surface. There follows, finally, a fifth lens L5 with negative focal length. The center points of the radius of curvature of the two surfaces of the fifth lens L5 lie on the image side. The curvature of the image-side surface is substantially greater than that of the object-side surface so that more than 80% of the refractive power is concentrated on the second surface. The refractive power of the fourth lens L4 and fifth lens L5 combined is −0.303-times the total refractive power of the microscope objective. The second lens, third lens and fourth lens L2, L3, L4 in the example are all made from the same material, i.e., a glass with fluor crown anomaly. However, this is not compulsory. In the construction examples in dependent claims 4 and 5, different materials are used for these lenses at least in part. The first lens L1 and the fifth lens L5 are made from different materials, but each has a short-flint anomaly.

In one embodiment, the stereoscopic microscope objective has the following constructional data, where r represents radii, d represents thickness, a represents distances in mm, $n_e$ represents refractive indexes at a wavelength of 546.07 nm and $\upsilon_e$ represents Abbe numbers:

|  | r | d | a | $n_e$ | $\upsilon_e$ |
|---|---|---|---|---|---|
| Object plane | ∞ |  |  |  |  |
|  |  |  | 80.00 |  |  |
|  | −546.349 |  |  |  |  |
| L1 |  | 4.00 |  | 1.7545 | 35.1 |
|  | 95.031 |  |  |  |  |
|  |  |  | 2.05 |  |  |
|  | 160.797 |  |  |  |  |
| L2 |  | 10.86 |  | 1.4879 | 84.1 |
|  | −78.302 |  |  |  |  |
|  |  |  | 0.15 |  |  |
|  | 74.990 |  |  |  |  |
| L3 |  | 13.02 |  | 1.4879 | 84.1 |
|  | −143.238 |  |  |  |  |
|  |  |  | 0.48 |  |  |
|  | 44.344 |  |  |  |  |
| L4 |  | 17.03 |  | 1.6225 | 63.2 |
|  | −127.098 |  |  |  |  |
|  |  |  | 0.80 |  |  |
|  | −112.672 |  |  |  |  |
| L5 |  | 4.00 |  | 1.5608 | 53.8 |
|  | 30.068 |  |  |  |  |

In another embodiment of the present invention, the stereoscopic microscope objective has the following constructional data, where r represents radii, d represents thickness, a represents distances in mm, $n_e$ represents indexes at a wavelength of 546.07 nm and $\upsilon_e$ represents Abbe numbers:

|  | r | d | a | $n_e$ | $\upsilon_e$ |
|---|---|---|---|---|---|
| Object plane | ∞ |  |  |  |  |
|  |  |  | 77.30 |  |  |
|  | −169.194 |  |  |  |  |
| L1 |  | 4.00 |  | 1.6164 | 44.2 |
|  | 87.219 |  |  |  |  |
|  |  |  | 3.01 |  |  |
|  | 160.878 |  |  |  |  |
| L2 |  | 12.00 |  | 1.4985 | 81.2 |
|  | −73.918 |  |  |  |  |
|  |  |  | 0.15 |  |  |
|  | 76.627 |  |  |  |  |
| L3 |  | 13.00 |  | 1.4985 | 81.2 |
|  | −105.075 |  |  |  |  |
|  |  |  | 1.85 |  |  |
|  | 42.475 |  |  |  |  |
| L4 |  | 16.00 |  | 1.6203 | 63.0 |
|  | 415.764 |  |  |  |  |
|  |  |  | 0.85 |  |  |
|  | 769.500 |  |  |  |  |
| L5 |  | 4.00 |  | 1.6164 | 44.2 |
|  | 30.288 |  |  |  |  |

In another embodiment of the present invention, the stereoscopic microscope objective has the following constructional data, where r represents radii, d represents thickness, a represents distances in mm, $n_e$ represents indexes at a wavelength of 546.07 nm and $\upsilon_e$ represents Abbe numbers:

|  | r | d | a | $n_e$ | $\upsilon_e$ |
|---|---|---|---|---|---|
| Object plane | ∞ |  |  |  |  |
|  |  |  | 81.8 |  |  |
|  | 494.088 |  |  |  |  |
| L1 |  | 4.00 |  | 1.7162 | 53.6 |
|  | 95.031 |  |  |  |  |
|  |  |  | 2.49 |  |  |
|  | 175.086 |  |  |  |  |
| L2 |  | 12.00 |  | 1.4985 | 81.1 |
|  | −80.011 |  |  |  |  |
|  |  |  | 0.15 |  |  |
|  | 67.313 |  |  |  |  |
| L3 |  | 13.00 |  | 1.4985 | 81.1 |
|  | −208.350 |  |  |  |  |
|  |  |  | 0.15 |  |  |
|  | 40.098 |  |  |  |  |
| L4 |  | 13.00 |  | 1.4985 | 81.1 |
|  | 91.729 |  |  |  |  |
|  |  |  | 1.20 |  |  |
|  | 91.071 |  |  |  |  |

-continued

|    | r      | d    | a | $n_e$  | $\upsilon_e$ |
|----|--------|------|---|--------|--------------|
| L5 | 31.395 | 4.00 |   | 1.6580 | 39.4         |

While the foregoing description and drawings represent the present invention, it will be obvious to those skilled in the art that various changes may be made therein without departing from the true spirit and scope of the present invention.

Reference Numbers
L1, . . . , L5 lenses
O object plane

What is claimed is:

1. A stereoscopic microscope objective comprising, in order from the object plane, a first lens (L1) with negative focal length ($f_1$), wherein the ratio of the focal length ($f_1$) to the total focal length (f) of the microscope objective is at least −2.11 and at most −1.20, and the proportion of refractive power of the image-side surface of the first lens (L1) is at least 80%, a second lens (L2) with positive focal length ($f_2$), wherein the ratio of the focal length ($f_2$) to the total focal length (f) is at least 1.30 and at most 1.45, and the proportion of refractive power of the image-side surface of the second lens (L2) is at least 60%, a third lens (L3) with positive focal length ($f_3$), wherein the ratio of the focal length ($f_3$) to the total focal length (f) is at least 1.15 and at most 1.37, and the proportion of refractive power of the object-side surface of the third lens (L3) is at least 60%, a fourth lens (L4) with positive focal length ($f_4$), wherein the ratio of the focal length ($f_4$) to the total focal length (f) is at least 0.65 and at most 1.70, and the proportion of refractive power of the object-side surface of the fourth lens (L4) is at least 70%, and a fifth lens (L5) with negative focal length ($f_5$), wherein the ratio of the focal length ($f_5$) to the total focal length (f) is at least −0.96 and at most −0.48, and the proportion of refractive power of the image-side surface of the fifth lens (L5) is at least 80%, wherein the amount of refractive power of the fourth lens (L4) and fifth lens (L5) combined is less than 0.31-times the total refractive power of the microscope objective, and wherein the first lens (L1) and fifth lens (L5) have a partial dispersion of a first type, and the second lens (L2), third lens (L3) and fourth lens (L4) are made of materials having a partial dispersion of a second type.

2. The stereoscopic microscope objective according to claim 1, wherein the first lens (L1) and fifth lens (L5) are made of glasses with a short-flint anomaly.

3. The stereoscopic microscope objective according to claim 1, wherein the second lens (L2), third lens (L3) and fourth lens (L4) are made of glasses with a fluor crown anomaly.

4. The stereoscopic microscope objective according to claim 1, having the following constructional data, where r represents radii, d represents thickness, a represents distances in mm, $n_e$ represents refractive indexes at a wavelength of 546.07 nm and $\upsilon_e$ represents Abbe numbers:

|              | r        | d     | a     | $n_e$  | $\upsilon_e$ |
|--------------|----------|-------|-------|--------|--------------|
| Object plane | ∞        |       | 80.00 |        |              |
| L1           | −546.349 | 4.00  |       | 1.7545 | 35.1         |
|              | 95.031   |       | 2.05  |        |              |
| L2           | 160.797  | 10.86 |       | 1.4879 | 84.1         |
|              | −78.302  |       | 0.15  |        |              |
| L3           | 74.990   | 13.02 |       | 1.4879 | 84.1         |
|              | −143.238 |       | 0.48  |        |              |
| L4           | 44.344   | 17.03 |       | 1.6225 | 63.2         |
|              | −127.098 |       | 0.80  |        |              |
| L5           | −112.672 | 4.00  |       | 1.5608 | 53.8         |
|              | 30.068   |       |       |        |              |

5. The stereoscopic microscope objective according to claim 1, having the following constructional data, where r represents radii, d represents thickness, a represents distances in mm, $n_e$ represents refractive indexes at a wavelength of 546.07 nm and $\upsilon_e$ represents Abbe numbers:

|              | r        | d     | a     | $n_e$  | $\upsilon_e$ |
|--------------|----------|-------|-------|--------|--------------|
| Object plane | ∞        |       | 77.30 |        |              |
| L1           | −169.194 | 4.00  |       | 1.6164 | 44.2         |
|              | 87.219   |       | 3.01  |        |              |
| L2           | 160.878  | 12.00 |       | 1.4985 | 81.2         |
|              | −73.918  |       | 0.15  |        |              |
| L3           | 76.627   | 13.00 |       | 1.4985 | 81.2         |
|              | −105.075 |       | 1.85  |        |              |
| L4           | 42.475   | 16.00 |       | 1.6203 | 63.0         |
|              | 415.764  |       | 0.85  |        |              |
| L5           | 769.500  | 4.00  |       | 1.6164 | 44.2         |
|              | 30.288   |       |       |        |              |

6. The stereoscopic microscope objective according to claim 1, having the following constructional data, where r represents radii, d represents thickness, a represents distances in mm, $n_e$ represents refractive indexes at a wavelength of 546.07 nm and $\upsilon_e$ represents Abbe numbers:

|              | r        | d     | a    | $n_e$  | $\upsilon_e$ |
|--------------|----------|-------|------|--------|--------------|
| Object plane | ∞        |       | 81.8 |        |              |
| L1           | 494.088  | 4.00  |      | 1.7162 | 53.6         |
|              | 95.031   |       | 2.49 |        |              |
| L2           | 175.086  | 12.00 |      | 1.4985 | 81.1         |
|              | −80.011  |       | 0.15 |        |              |
| L3           | 67.313   | 13.00 |      | 1.4985 | 81.1         |
|              | −208.350 |       | 0.15 |        |              |
| L4           | 40.098   | 13.00 |      | 1.4985 | 81.1         |
|              | 91.729   |       | 1.20 |        |              |
| L5           | 91.071   | 4.00  |      | 1.6580 | 39.4         |
|              | 31.395   |       |      |        |              |

* * * * *